(12) United States Patent
Schmidt et al.

(10) Patent No.: US 7,479,083 B2
(45) Date of Patent: Jan. 20, 2009

(54) GEAR MECHANISM

(75) Inventors: Willi Schmidt, Stutensee-Buechig (DE); Jochen Moench, Sinzheim (DE); Daniel Cettier, Karlsruhe (DE)

(73) Assignee: Robert Bosch GmbH (DE)

( * ) Notice: Subject to any disclaimer, the term of this patent is extended or adjusted under 35 U.S.C. 154(b) by 322 days.

(21) Appl. No.: 10/579,886

(22) PCT Filed: Oct. 22, 2004

(86) PCT No.: PCT/DE2004/002360

§ 371 (c)(1),
(2), (4) Date: May 18, 2006

(87) PCT Pub. No.: WO2005/059401

PCT Pub. Date: Jun. 30, 2005

(65) Prior Publication Data

US 2007/0087887 A1   Apr. 19, 2007

(30) Foreign Application Priority Data

Dec. 18, 2003  (DE) .............................. 103 59 575

(51) Int. Cl.
*F16H 1/32* (2006.01)
(52) U.S. Cl. ..................................................... 475/162
(58) Field of Classification Search .................. None
See application file for complete search history.

(56) References Cited

U.S. PATENT DOCUMENTS

| 1,563,945 | A |   | 12/1925 | Apple |
| 3,077,125 | A |   | 2/1963  | Louton, Jr. et al. |
| 3,286,550 | A |   | 11/1966 | Rosain et al. |
| 3,546,972 | A | * | 12/1970 | Morozumi ................... 475/178 |
| 4,228,698 | A |   | 10/1980 | Winiasz |
| 5,030,184 | A | * | 7/1991  | Rennerfelt ................... 475/162 |
| 5,505,668 | A | * | 4/1996  | Koriakov-Savoysky et al. .. 475/180 |

FOREIGN PATENT DOCUMENTS

EP            0 981 696           3/2000

* cited by examiner

*Primary Examiner*—Dirk Wright
(74) *Attorney, Agent, or Firm*—Michael Best & Friedrich LLP

(57) ABSTRACT

Gear mechanism (10), in particular for adjusting moveable parts in a motor vehicle, comprising a spur wheel (14) which is provided with external teeth (16) and meshes with an internal gear (18) that is provided with internal teeth (20), wherein the number of internal teeth (20) to generate a certain gear step-up ratio is greater by at least one than the number of external teeth (16) and the spur wheel (14) and the internal gear (18) perform an eccentric movement relative to one another, wherein the eccentric movement is directed exclusively by means of the matching tooth geometry of the internal and external teeth (20, 16).

19 Claims, 4 Drawing Sheets ced output moment can be gripped by the carrier. The lower efficiency of this type of gear design, which is caused by the friction between the gearing and the bearing of the eccentric wheel, has proven to be disadvantageous, particularly in the case of high step-up ratios. In addition, narrow tolerances must be complied with when manufacturing such a gear mechanism, because, on the one hand, jamming of the gearing from the overdetermined bearing and too much play in the gearing, on the other hand, must be avoided.

GEAR MECHANISM

BACKGROUND OF THE INVENTION

The invention relates to a gear mechanism, in particular for adjusting moveable parts in a motor vehicle.

An eccentric toothed wheel gear mechanism is known from EP 0 981 696 B1 in which an eccentric wheel embodied as an internal gearwheel is positioned on an eccentric, which is put into rotation by a drive element embodied as an armature. Arranged within the internal gearwheel is a carrier with external teeth, wherein the external teeth cooperate with the internal teeth of the internal gear by meshing in sections so that a reduced output moment can be gripped by the carrier. The lower efficiency of this type of gear design, which is caused by the friction between the gearing and the bearing of the eccentric wheel, has proven to be disadvantageous, particularly in the case of high step-up ratios. In addition, narrow tolerances must be complied with when manufacturing such a gear mechanism, because, on the one hand, jamming of the gearing from the overdetermined bearing and too much play in the gearing, on the other hand, must be avoided.

SUMMARY OF THE INVENTION

The gear mechanism in accordance with the invention has the advantage that, because of directing the eccentric movement by means of the tooth geometry of the internal and external teeth, an eccentric, on which the spur wheel or the internal gear is positioned in the case of conventional eccentric gears, can be dispensed with. As a result, the bearing of the two toothed wheels that are moved eccentrically towards each other is no longer overdetermined, thereby considerably reducing the friction arising from the bearing in accordance with the invention of the spur wheel or the internal gear. Thus, the efficiency of this type of gear mechanism can be increased considerably in that directing the eccentric movement when mutually rolling off of both gearings is forced exclusively by the mutual gear meshing in accordance with the invention. With such an eccentric-less embodiment of the wobble gear, the very expensive precise manufacturing of the eccentric bearing is eliminated.

In order to avoid additional friction from the bearing of the spur wheel, it is connected to the drive element or driven element so that is radially moveable in such a way that the spur wheel can follow the eccentric movement forced by the tooth geometry with minimal friction losses. In doing so, the driving torque or output moment is transmitted in a practically undisturbed manner by the drive element to the driven element.

Depending upon the design of the gear mechanism, the internal gear can be driven instead of the spur wheel, wherein the reduced output moment can then be gripped by the spur wheel. Thus, the spur wheel or alternatively the internal gear can be coupled radially flexibly on the corresponding drive element or driven element in order to increase efficiency.

An elastic element, which connects the spur wheel or the internal gear to the drive element or the driven element, has proven to be especially advantageous for such a coupling. The elastic element can be embodied as an elastomer for example, whose shape and material properties permit a radial deflection, but is embodied to be relatively rigid against torsion. This type of coupling does not have any mechanical friction surfaces so that efficiency and service life are quite high.

In a preferred embodiment, the spur wheel is embodied as an eccentric wheel, which is prevented from rotating around the drive axis via cooperation with housing-mounted guide elements. In this case, the output moment can be gripped directly by the rotatable internal gear.

In an alternative design, the spur wheel is arranged so it can freely rotate within a housing-mounted internal gear, thereby achieving a more compact construction. In this case, output takes place advantageously via a carrier, which engages in corresponding receptacles of the spur wheel.

If the drive element is embodied as an armature shaft of an electric motor, the internal gear or the spur wheel can be arranged on the motor shaft directly radially free-moving and be coupled with it radially flexibly. In this case, the gear mechanism can be arranged in the motor housing in an especially space-saving manner.

In another design, the spur wheel is rotatably mounted on a bridge and arranged within a rotationally secured internal gear. The output takes place in this case via a second internal gear with a different number of teeth and which is positioned on the driven element so that it has free movement radially and executes an eccentric movement vis-à-vis the spur wheel.

In order to direct the spur wheel on an eccentric movement vis-à-vis the internal gear and prevent radial displacement of both wheels against each other, it is advantageous to embody the outside diameter of the external teeth of the spur wheel to be greater than the inside diameter of the internal teeth of the internal gear.

In order to accomplish directing the eccentric movement without a bearing of the internal gear or the spur wheel on an eccentric, the gear teeth are formed as involute toothing or cycloidal pinion tooth gearing with corresponding tooth geometry in accordance with the invention.

If the spur wheel or the internal gear is positioned on the drive shaft or the driven shaft so that it has free movement radially, then jamming of the gearing can be minimized and manufacturing of the gearing can take with broader tolerances.

If, when there is meshing in sections of the external teeth in the internal teeth, the spur wheel is no longer displaced radially against the internal gear due to the tooth geometry, then both wheels are directed towards one another on an eccentric movement via the rotational drive, which results in a corresponding stepping down as a function of the difference in the number of teeth.

BRIEF DESCRIPTION OF THE DRAWINGS

Different exemplary embodiments of a gear mechanism in accordance with the invention are depicted in the drawings and explained in greater detail in the following description. The drawings show.

DETAILED DESCRIPTION

Figure 1:
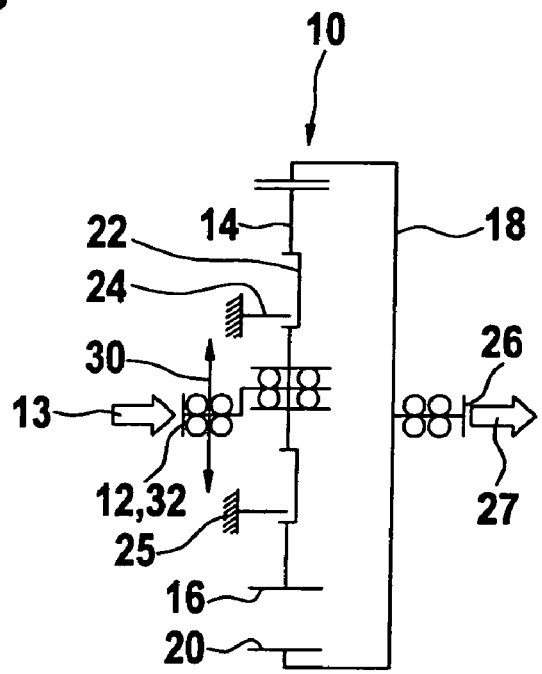
FIG. 1 A schematic depiction of a spur wheel that is positioned so that it has free movement axially.

FIG. 1 schematically shows a step-down gear mechanism 10 with a drive element 12, on which a spur wheel 14 with external teeth 16 is positioned so that it has free movement radially. The spur wheel 14 is arranged within an internal gear 18 with internal teeth 20 and has receptacles 22, which cooperate with housing-mounted locking elements 24 in order to prevent the spur wheel 14 from rotating. The internal gear 18 is connected to a driven element 26, which is mounted so that it can freely rotate. If driving torque (depicted by arrow 13) now acts on the drive element 12, it is set into rotation around an axis 28. The spur wheel 14 is connected to the rotating drive element 12 by means of a torsion-proof, but radially free-moving, coupling 30 (depicted by arrow 30) and due to the teeth engagement of the external teeth 16 and the internal teeth 20 with a special tooth geometry is forced into an eccentric movement vis-à-vis the internal gear 18. Since a self-rotation of the spur wheel 14 is prevented by the locking elements 24 arranged on the housing 25, the internal gear 18 positioned on the axis 28 is set into rotation with driven element 26, whereby the step-down ratio corresponds to the difference in the number of teeth between the external teeth 16 and the internal teeth 20. As a result, the output moment 27 depicted by arrow 27 is available on the driven element 26. It must be specially emphasized that in this case the spur wheel 14 is not positioned on an eccentric, which would force the spur wheel 14 on an eccentric path; rather, the eccentric movement is produced exclusively as a result of the special tooth geometry of the external teeth 14 and the internal teeth 18, initiated by rotation moment 13.

Figure 2:
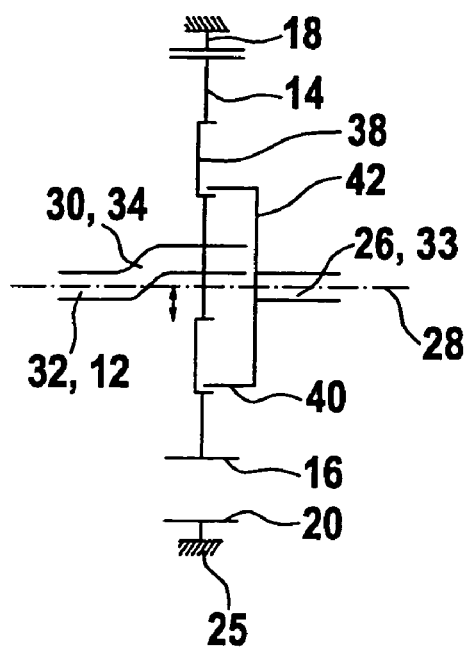
FIG. 2 Another eccentric gear mechanism with a radial elastic coupling.

A concrete execution of a radially free-moving coupling 30 is depicted in another exemplary embodiment of an eccentric gear mechanism in FIG. 2. In this case, the spur wheel 14 is connected to a drive element 12 embodied as a drive shaft 32 by means of an elastic element 34. The rotation moment 13 is transmitted approximately slip-free to the spur wheel 14, but remains freely moveable radially vis-à-vis the drive shaft 32 within the housing-mounted internal gear 18.

If the drive element 12 is set into rotation, the spur wheel 14 in this design also executes a self rotation in addition to the eccentric movement forced by the tooth geometry because no locking elements 24 are attached. However, the spur wheel 14 features meshing elements 38, in which the corresponding counter-elements 40 of a carrier 42 positioned on the axis 28 engage. Because of the play between the meshing elements 38 and the corresponding counter-elements 40, the carrier 42 executes a uniform rotation around the axis 28 and makes an output moment 27 available on the driven element 26, which is embodied as a driven shaft 33 for example.

Figure 3:
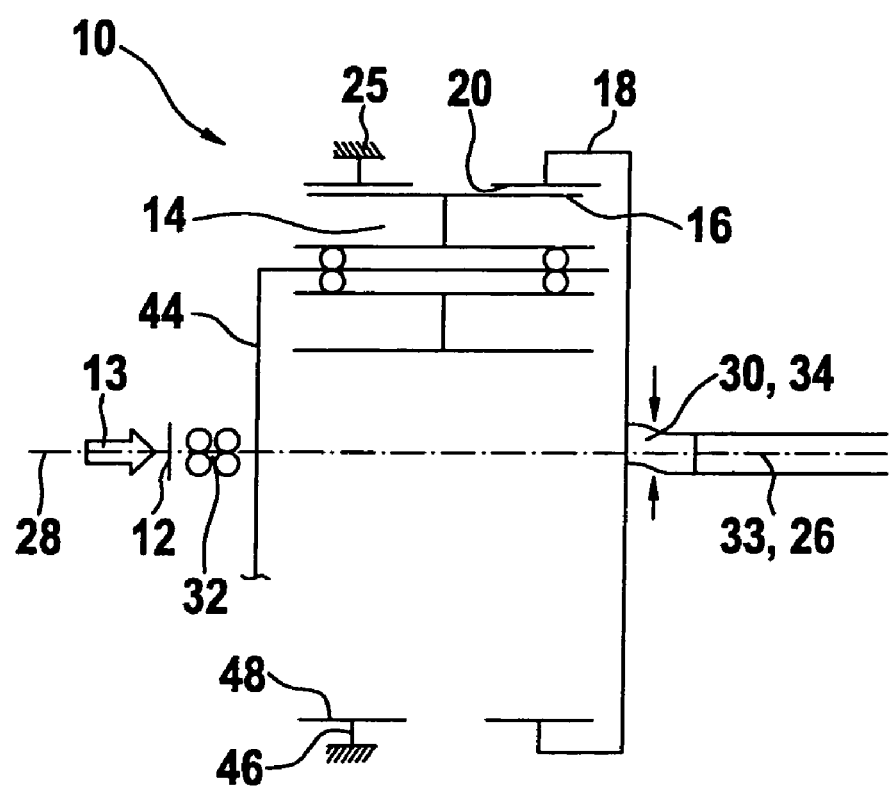
FIG. 3 Another gear mechanism with a fixed and a rotatable internal gear.

In another exemplary embodiment in accordance with FIG. 3, the drive element 12 has a bridge 44, on which the spur wheel 14 is rotatably mounted. The drive element 12 in this case is positioned radially fixed on the gear axis 28 so that when driving torque 13 acts, the spur wheel 14 rolls off uniformly in a first housing-mounted internal gear 46 with internal teeth 48. The second internal gear 18 with the internal teeth 20 is arranged axially offset so it can freely rotate and connected to an output shaft 33 positioned on the axis 28 via a radially elastic coupling 30. Because of the tooth geometry of the intermeshing external teeth 16 and the internal teeth 20, the internal gear 18 executes an eccentric movement, which is converted into a uniform rotation of the driven shaft 33 via the radially flexible coupling 30. In contrast to the exemplary embodiment in FIG. 2, in this case the actuation of the spur wheel 14 occurs via a radially rigid bearing and the output via the radially elastically positioned internal gear 18, which executes an eccentric movement superimposed for rotation.

Figure 4:
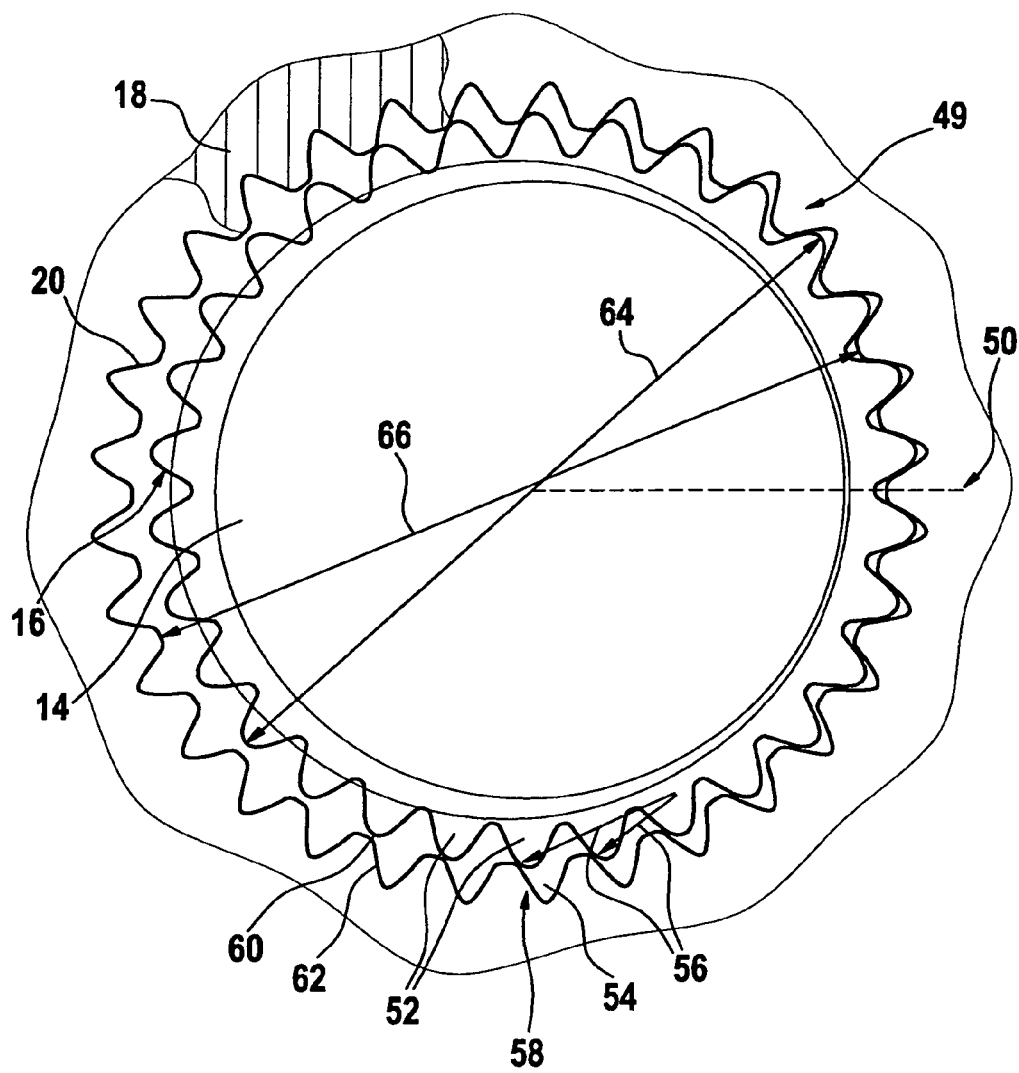
FIGS. 4 and 5 An illustration in accordance with the invention of the tooth geometry of involute toothing and cycloidal pinion tooth gearing.

FIG. 4 depicts an enlarged representation of the external teeth 16 of the spur wheel 14 and the internal teeth 20 of the internal gear 18 using the example of involute toothing 49. If, for example, the internal gear 18 is positioned radially rigidly and the spur wheel 14 that is put into rotation is positioned via an elastic coupling 30 so that it has free movement radially, then the spur wheel 14 executes an eccentric movement just because of the tooth geometry of the external teeth 16 and the internal teeth 20. The "snapshot" shows the maximum gear meshing with the maximum power transmission at the three o'clock position 50. If the spur wheel 14 is rotated by the driving torque 13 in a clockwise direction, the teeth 52 of the external gearing 16 are pressed into the tooth spaces 54 of the internal teeth 20, as depicted by arrow 56 in the six o'clock position 58. In the process, the tooth tips 60 glide radially along the tooth flanks 62 so that the spur wheel 14 is also forced to rotate on an eccentric path. In FIG. 4, the external teeth 16 have a greater outside diameter 64 than the inside diameter 66 of the internal teeth 20. The tooth geometry of the external teeth 16 and the internal teeth 20 is formed in this case so that the spur wheel 14 cannot be displaced radially vis-à-vis the internal gear 18; rather, a radial movement can only occur in connection with a rotation of the spur wheel 14. This type of eccentric guidance replaces the rotatable bearing of the spur wheel 14 on an eccentric arranged rotationally secured on the drive shaft 32. Because of the radially free-moving bearing of the spur wheel 14 on the drive shaft 32, the bearing of the gear mechanism 10 is no longer overdetermined so that bearing friction and jamming due to the eccentric are avoided. In this case, the dipping into one another of the teeth 52 of the internal gear 18 and the spur wheel 14 are used to absorb the reaction forces and specify the path of the spur wheel 14. In addition, the directing forces applied by the gearing 16, 20 for the eccentric movement between the spur wheel 14 and the internal gear 18 act on the same diameter so that the resulting frictional forces are considerably lower than with an eccentric bearing. However, the friction in the case of directing the eccentric movement in accordance with the invention is determined by means of the tooth geometry essentially by a compromise between avoiding jamming and minimizing the play between the two gearings 16, 20. The lower the difference in the number of teeth between the spur wheel 14 and the internal gear 18, the simpler it is to build up appropriately functioning tooth geometry for directing the eccentric movement.

As an example for tooth geometry in accordance with the invention for an involute toothing, the spur wheel 14 has a tooth number of 30, a real pitch module of 2 mm, a pressure angle of 30°, a tip circle of 62.859 mm, a root circle of 55.13 mm, an addendum modification coefficient of 0.0825 and an axis distance (eccentricity) of −2 mm. The internal gear 18 has a tooth number of −32, a real pitch module of 2 mm, a pressure angle of 30°, a tip circle of −60.83 mm, a root circle of −68.559 mm, an addendum modification coefficient of 0.0825 and an axis distance (eccentricity) of −2 mm. Since both gearings 16, 20 cannot be displaced radially against one another, the two gearwheels can only be slid axially into each other in order to produce gear meshing. With such an arrangement, directing the eccentric movement takes place exclusively by means of the tooth geometry. The tooth flanks 62 of one gearing 20 force the tooth tips 60 of the other gearing 16 into the corresponding tooth space 54. As a result, the gear mechanism 10 is embodied to be eccentric-less. In this connection, neither the spur wheel 14 nor the internal gear 18 are guided by means of an eccentric, but merely arranged to be radially free-moving on the drive shaft or the driven shaft 32, 33.

Figure 5:
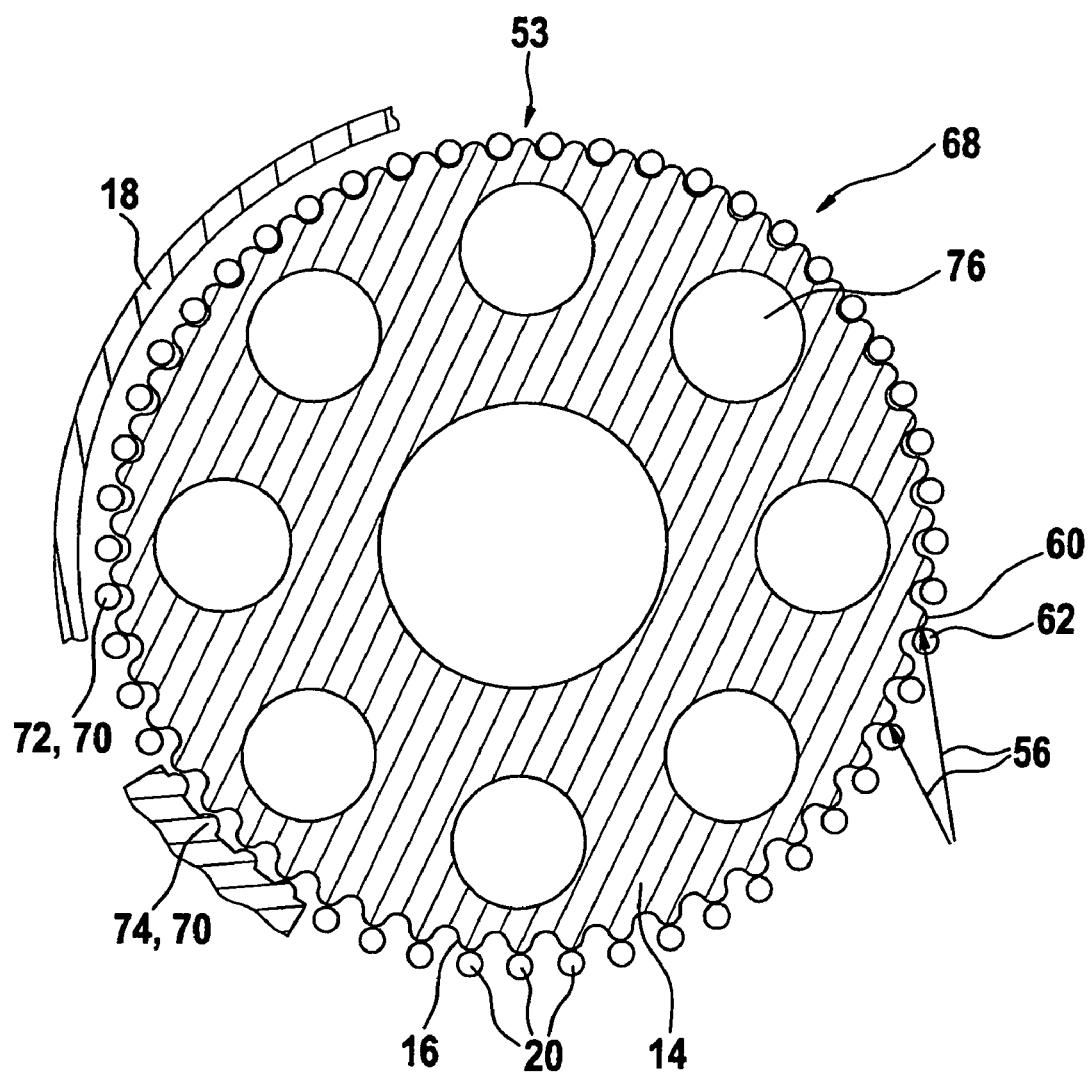

FIG. 5 shows another execution of the gearing 16, 20 in accordance with the invention as cycloidal pinion tooth gearing 68, wherein the internal gear 18 features cylindrical rolls 70 as internal teeth 20, which are embodied either as freely rotating sleeves 72 or formations 74 fixed to the internal gear. The spur wheel 14 features several circular recesses 76, which cooperate for example with housing-mounted locking elements 24 or with counter-elements 40 of a carrier 42. Like the involute toothing 49 in FIG. 4, the spur wheel 14 that is set into rotation is forced on an eccentric path because of the tooth geometry. The maximum moment transmission occurs in this case in the 12 o'clock position 53. The eccentric-less forced directing of the tooth tips 60 along the tooth flanks 62 that are shaped like a segment of a circle is depicted in turn by arrow 56.

It must be noted that, with respect to the exemplary embodiments depicted in all the figures and in description, diverse combination possibilities of the individual features among one another are possible. In particular, the concrete designs of the gear mechanisms (eccentric gear, planetary gear), the formation of the gearing, the designs of the drive element and driven element 12, 26 can be varied at will. Essential in this case is just that the eccentric movement of the spur wheel 14 vis-à-vis the internal gear 18 is directed by the tooth geometry of the external and internal teeth 16, 20 so that the spur wheel 14 or the internal gear 18 can be arranged so that it has free movement radially vis-à-vis the gear axis 28. In this case, the radially flexible coupling 30 can be executed as desired. The step-down gear mechanism 10 preferably finds application for adjusting seat parts or for a windshield wiper drive in combination with an electric motor, but can also be used for any other drives.

The invention claimed is:

1. Gear mechanism (10) comprising a spur wheel (14) which is provided with external teeth (16) and meshes with an internal gear (18) that is provided with internal teeth (20), wherein the number of internal teeth (20) to generate a certain gear step-up ratio is greater by at least one than the number of external teeth (16) and the spur wheel (14) and the internal gear (18) perform an eccentric movement relative to one another, characterized in that the eccentric movement is directed by means of the matching tooth geometry of the internal and external teeth (20, 16), and wherein the outside diameter (64) of the external teeth (16) is greater than the inside diameter (66) of the internal teeth (20).

2. Gear mechanism (10) according to claim 1, characterized in that the spur wheel (14) is coupled with a drive element (12, 32) rotating around an axis (28) or a driven element (26, 33), wherein the coupling (30, 34) is embodied to be radially flexible vis-à-vis the axis (28).

3. Gear mechanism (10) according to claim 1, characterized in that the internal gear (18) is coupled with a drive element (12, 32) rotating around the axis (28) or a driven element (26, 33), wherein the coupling (30, 34) is embodied to be radially flexible vis-à-vis the axis (28).

4. Gear mechanism (10) according to claim 1, characterized in that the coupling (30) features an elastic element (34) which is embodied to torsion-proof and radially moveable.

5. Gear mechanism (10) according to claim 1, characterized in that the spur wheel (14) is prevented from rotating around the axis (28) and the internal gear (18) is mounted so that it can freely rotate.

6. Gear mechanism (10) according to claim 1, characterized in that the spur wheel (14) is arranged so it can freely rotate and the internal gear (18) is arranged so that it is rotationally secured.

7. Gear mechanism (10) according to claim 1, characterized in that the driven element (26) is embodied as a carrier (42), which cooperates with meshing elements (38, 22) of the spur wheel (14).

8. Gear mechanism (10) according to claim 1, characterized in that the drive element (12) is formed by a motor shaft (32).

9. Gear mechanism (10) according to claim 1, characterized in that the spur wheel (14) or the internal gear (18) is positioned so that it has free movement radially on a drive shaft (32) or a driven shaft (33).

10. Gear mechanism (10) according to claim 1, characterized in that the internal teeth (20) engage in the external teeth (16) in such a way that the spur wheel (14) is not radially displaceable vis-à-vis the internal gear (18).

11. Gear mechanism (10) comprising a spur wheel (14) which is provided with external teeth (16) and meshes with an internal gear (18) that is provided with internal teeth (20), wherein the number of internal teeth (20) to generate a certain gear step-up ratio is greater by at least one than the number of external teeth (16) and the spur wheel (14) and the internal gear (18) perform an eccentric movement relative to one another, characterized in that the eccentric movement is directed by means of the matching tooth geometry of the internal and external teeth (20, 16), and wherein the spur wheel (14) is coupled with a drive element (12, 32) rotating around an axis (28) or a driven element (26, 33), wherein the coupling (30, 34) is embodied to be radially flexible vis-à-vis the axis (28).

12. Gear mechanism (10) according to claim 11, characterized in that the spur wheel (14) is arranged rotatably on a bridge (44) of the drive element (12, 32) and meshes with two internal gears (46, 18) that are arranged axially vis-à-vis each other and have a different number of teeth.

13. Gear mechanism (10) according to claim 11, characterized in that the internal teeth (20) and the external teeth (16) are embodied as involute toothing (49) or cycloidal pinion tooth gearing (68).

14. Gear mechanism (10) comprising a spur wheel (14) which is provided with external teeth (16) and meshes with an internal gear (18) that is provided with internal teeth (20), wherein the number of internal teeth (20) to generate a certain gear step-up ratio is greater by at least one than the number of external teeth (16) and the spur wheel (14) and the internal gear (18) perform an eccentric movement relative to one another, characterized in that the eccentric movement is directed by means of the matching tooth geometry of the internal and external teeth (20, 16), and wherein the internal gear (18) is coupled with a drive element (12, 32) rotating around the axis (28) or a driven element (26, 33), wherein the coupling (30, 34) is embodied to be radially flexible vis-à-vis the axis (28).

15. Gear mechanism (10) according to claim 14, characterized in that the spur wheel (14) is arranged rotatably on a bridge (44) of the drive element (12, 32) and meshes with two internal gears (46, 18) that are arranged axially vis-à-vis each other and have a different number of teeth.

16. Gear mechanism (10) according to claim 14, characterized in that the internal teeth (20) and the external teeth (16) are embodied as involute toothing (49) or cycloidal pinion tooth gearing (68).

17. Gear mechanism (10) comprising a spur wheel (14) which is provided with external teeth (16) and meshes with an internal gear (18) that is provided with internal teeth (20), wherein the number of internal teeth (20) to generate a certain gear step-up ratio is greater by at least one than the number of external teeth (16) and the spur wheel (14) and the internal gear (18) perform an eccentric movement relative to one another, characterized in that the eccentric movement is directed by means of the matching tooth geometry of the internal and external teeth (20, 16), and wherein the coupling (30) features an elastic element (34), in particular an elastomer, which is embodied to torsion-proof and radially moveable.

18. Gear mechanism (10) according to claim 17, characterized in that the spur wheel (14) is arranged rotatably on a bridge (44) of the drive element (12, 32) and meshes with two internal gears (46, 18) that are arranged axially vis-à-vis each other and have a different number of teeth.

19. Gear mechanism (10) according to claim 17, characterized in that the internal teeth (20) and the external teeth (16) are embodied as involute toothing (49) or cycloidal pinion tooth gearing (68).

* * * * *